(12) United States Patent
Swann

(10) Patent No.: US 12,031,493 B2
(45) Date of Patent: Jul. 9, 2024

(54) ENGINE SYSTEM AND METHOD OF OPERATING THE SAME

(71) Applicant: ROLLS-ROYCE plc, London (GB)

(72) Inventor: Peter Swann, Derby (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 18/162,949

(22) Filed: Feb. 1, 2023

(65) Prior Publication Data

US 2023/0258135 A1    Aug. 17, 2023

(30) Foreign Application Priority Data

Feb. 15, 2022   (GB) ...................................... 2201986

(51) Int. Cl.
*F02C 9/40*   (2006.01)
*F02C 7/22*   (2006.01)

(52) U.S. Cl.
CPC .................. *F02C 9/40* (2013.01); *F02C 7/22* (2013.01); *F05D 2220/323* (2013.01); *F05D 2270/053* (2013.01); *F05D 2270/08* (2013.01); *F05D 2270/303* (2013.01)

(58) Field of Classification Search
CPC ...................................... F02C 9/40; F23R 3/36
See application file for complete search history.

(56) References Cited

U.S. PATENT DOCUMENTS

| | | | |
|---|---|---|---|
| 3,866,108 A | * | 2/1975 | Yannone ................... F02C 9/40 322/14 |
| 3,875,380 A | | 4/1975 | Rankin |
| 2003/0131604 A1 | | 7/2003 | Scott |
| 2009/0301096 A1 | | 12/2009 | Remy et al. |

(Continued)

FOREIGN PATENT DOCUMENTS

| | | |
|---|---|---|
| EP | 1655456 A2 | 5/2006 |
| EP | 2442031 A1 | 4/2012 |

(Continued)

OTHER PUBLICATIONS

"Gases-Specific Heats and Individual Gas Constants." The Engineering ToolBox, Dec. 16, 2023, https://www.engineeringtoolbox.com/specific-heat-capacity-gases-d_159.html. (Year: 2023).*

(Continued)

*Primary Examiner* — Katheryn A Malatek
(74) *Attorney, Agent, or Firm* — Barnes & Thornburg LLP

(57) ABSTRACT

A system has first and second fuel stores for first and second fuels, an engine, a fuel distribution system, first and second flow rates of the fuel contributing to a total flow rate of fuel; and a controller for controlling the relative fractions of the total flow rate of fuel to the engine according to the required power output of the engine such that the relative fraction of the total flow rate of fuel to the engine represented by the second flow rate increases with increasing required power output of the engine. The fuels are selected such that using only the second fuel results in a lower engine temperature than using only the first fuel, for the same mechanical power and/or the second fuel has a lower specific energy than the first and/or the second fuel produces more water during combustion than the first fuel per unit of fuel energy.

19 Claims, 4 Drawing Sheets

(56) References Cited

U.S. PATENT DOCUMENTS

| | | | | |
|---|---|---|---|---|
| 2010/0162678 A1* | 7/2010 | Annigeri | ............... | F02C 3/22 |
| | | | | 60/39.463 |
| 2011/0016873 A1* | 1/2011 | Nakamura | ............ | F23K 5/005 |
| | | | | 60/790 |
| 2011/0126545 A1* | 6/2011 | Loeven, II | ............ | F23R 3/36 |
| | | | | 60/39.281 |
| 2015/0059353 A1* | 3/2015 | Asai | ..................... | F23R 3/26 |
| | | | | 60/785 |
| 2016/0076461 A1 | 3/2016 | Kawai et al. | | |
| 2016/0146117 A1 | 5/2016 | Swann | | |
| 2022/0178544 A1 | 6/2022 | Durand et al. | | |

FOREIGN PATENT DOCUMENTS

| | | | |
|---|---|---|---|
| EP | 2767697 | A1 | 8/2014 |
| GB | 1410526 | A | 10/1975 |
| GB | 2602936 | A | 7/2022 |
| JP | S62126228 | A | 6/1987 |
| JP | 2008215184 | A | 9/2008 |
| WO | 03044353 | A1 | 5/2003 |
| WO | 2007069309 | A1 | 6/2007 |
| WO | 2012045028 | A1 | 4/2012 |
| WO | 2012045029 | A1 | 4/2012 |
| WO | 2014130117 | A2 | 8/2014 |

OTHER PUBLICATIONS

European Search Report dated Jul. 4, 2023, issued in EP Patent Application No. 23153265.6.
European Search Report dated Jul. 4, 2023, issued in EP Patent Application No. 23153267.2.
Zheng, T., Gao, C., Huang, W., Modelling and Performance Analysis of a Recuperated Gas Turbine with low-Btu fuel, DOI: 10.1016/j.applthermaleng.2021.117514NPL: XP86832275, Sep. 2, 2021, Elsevier.
European Search report dated Jul. 4, 2023, issued in EP Patent Application No. 231533266.4.
Great Britain search report dated Aug. 16, 2022, issued in GB Patent Application No. 2201986.3.
Great Britain search report dated Aug. 12, 2022, issued in GB Patent Application No. 2201985.5.
Great Britain search report dated Aug. 15, 2022, issued in GB Patent Application No. 2201987.1.

* cited by examiner

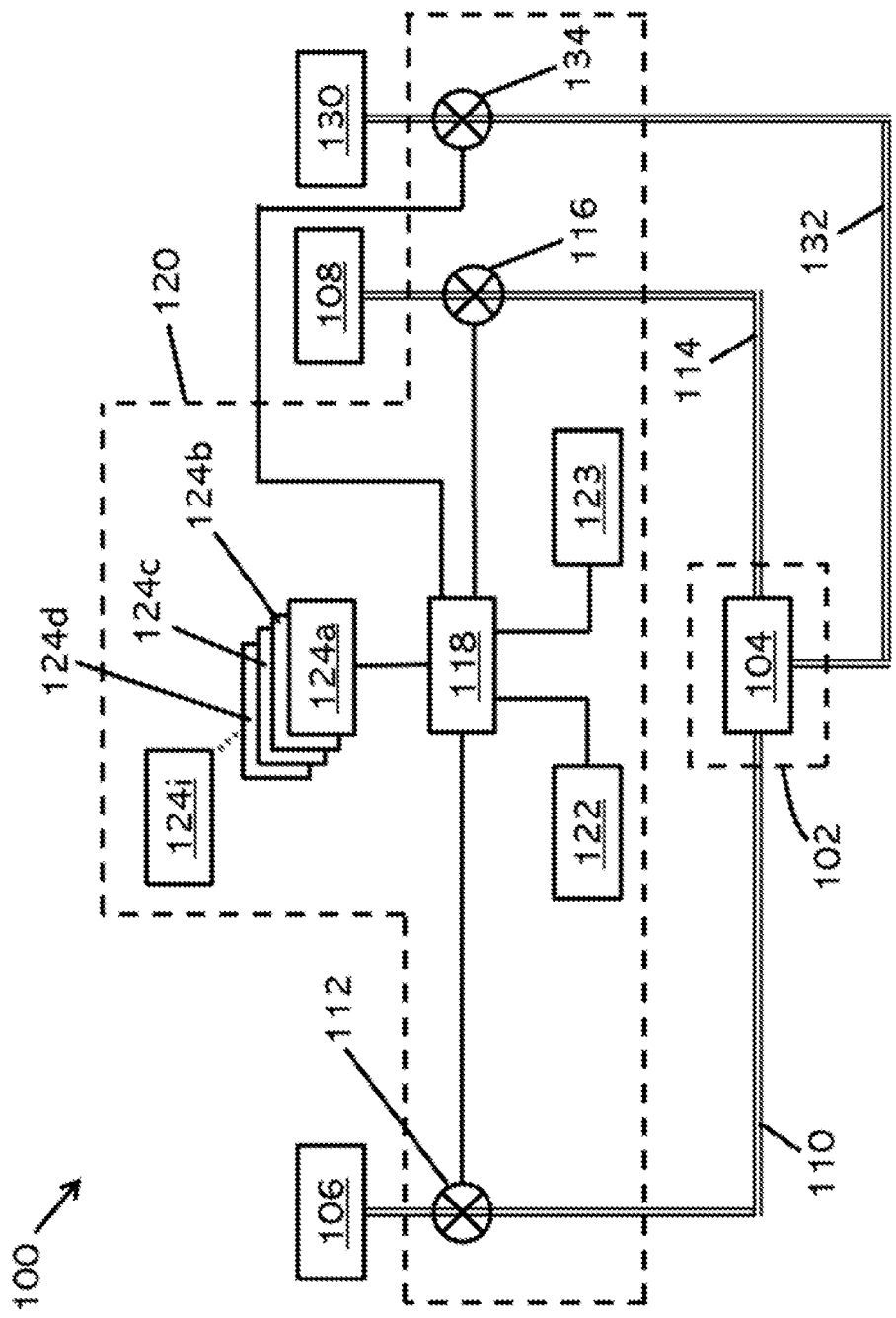

ENGINE SYSTEM AND METHOD OF OPERATING THE SAME

CROSS-REFERENCE TO RELATED APPLICATIONS

This specification is based upon and claims the benefit of priority from United Kingdom patent application number GB 2201986.3 filed on Feb. 15, 2022, the entire contents of which is incorporated herein by reference.

BACKGROUND

Technical Field

This disclosure relates to engines systems and propulsions systems and to methods of operating engines systems and propulsion systems. In particular but not exclusively, the present disclosure relates to aircraft engine systems and aircraft propulsion systems and to methods of operating aircraft engine systems and aircraft propulsion systems.

Description of the Related Art

Hydrogen and ammonia have previously been proposed as fuels for gas turbine engines because they do not produce carbon dioxide during operation.

Hydrogen has high specific energy making it an attractive option for driving a turbine engine since combustion of hydrogen will release a high amount of energy. However, it requires heavy storage tanks. This means that the effective specific energy of hydrogen (the specific energy accounting for the weight of storage tanks as well as the fuel) is relatively low.

The specific energy of ammonia is lower than hydrogen, and many hydrocarbon fuels such as methane and kerosene. This lower specific energy means a greater fuel mass flow is required through the engine to release energy at the same rate, for example by combustion. Ammonia is easier to store than hydrogen, requiring less thermal insulation and/or less high containment pressure, and so the effective specific energy of ammonia, after taking account of the weight of tanks, may be closer to that of hydrogen.

The low effective specific energies of ammonia and hydrogen means that, using only hydrogen and/or ammonia is not suitable for medium or long range journeys when used in aircraft or other vehicles where the weight may be prohibitive.

In order to maximise the range of a vehicle powered by a gas turbine engine, whilst still taking advantage of the reduced carbon dioxide emissions from hydrogen or ammonia, engines have been proposed which use both non-hydrocarbon fuel (such as hydrogen or ammonia) and hydrocarbon fuel (typically kerosene or methane).

SUMMARY

According to a first aspect, there is provided an engine system comprising: a first fuel store of a first fuel; a second fuel store of a second fuel; an engine arranged to produce mechanical power by combustion or oxidation of fuel in the engine; a fuel distribution system arranged to deliver fuel from the first and second fuel stores to the engine, the first fuel delivered at a first flow rate, the second fuel delivered at a second flow rate, the first and second flow rates contributing to a total flow rate of fuel to the engine; and a control system arranged to control the relative fractions of the total flow rate of fuel to the engine represented by the first and second flow rates according to the required power output of the engine such that the relative fraction of the total flow rate of fuel to the engine represented by the second flow rate increases with increasing required power output of the engine for at least part of a period of operation of the engine, wherein the first and second fuels are selected such that operation of the engine using only the second fuel results in a lower engine temperature than operation of the engine using only the first fuel, when producing the same amount of mechanical power and/or wherein the second fuel has a lower specific energy than the first fuel and/or wherein the second fuel produces more water during combustion than the first fuel per unit of fuel energy released during combustion.

The control system may be arranged to, during a period of acceleration, control the relative fractions of the total mass flow rate of fuel represented by the first mass flow rate and the second mass flow rate based on a surge margin.

A one of the first fuel or second fuel may have a higher specific energy than the other of the first fuel and second fuel and releases a greater mass of water per unit mass of fuel than the other of the first fuel and second fuel.

The control system may be arranged to increase the relative fraction of the one of the first fuel or second fuel during an initial portion of the period of acceleration.

The control system may be arranged to reduce the relative fraction of the total mass flow rate of fuel represented by the one of the first fuel and second fuel during a final portion of the period of acceleration.

The control system may be arranged to control the relative fractions of the total mass flow rate of fuel provided by the first mass flow rate and second mass flow rate such that: the surge margin is increased compared to operating on the other of the first fuel or second fuel only and the rate of acceleration is the same as operating on the other of the first fuel or second fuel only; or the surge margin is the same as operating on the other of the first fuel or second fuel only and the rate of acceleration is increased compared to operation using the other of the first fuel or second fuel only.

The control system may be arranged to, during a period of operation of the engine, control the relative fractions of the total mass flow rate of fuel represented by the first mass flow rate and the second mass flow rate, based on an engine temperature.

The control system may be arranged to control the relative fractions of the total mass flow rate of fuel represented by the first mass flow rate and the second mass flow rate to change the engine temperature at a first rate of change, whilst maintaining constant mechanical power.

The control system may be arranged to vary the engine temperature at constant mechanical power prior to a period of increased or decreased mechanical power demand to pre-warm or pre-cool the engine, wherein the first rate of change is slower than the rate of change of engine temperature resulting from the change in mechanical power demand without pre-warming or pre-cooling.

The control system may be arranged to control the relative fractions of the total mass flow rate of fuel represented by the first mass flow rate and the second mass flow rate to keep the engine temperature below a threshold temperature for at least a section of a period of operation.

The threshold temperature is variable in different sections of the period of operation.

The control system may be arranged to increase the threshold temperature in sections of the period of operation with higher mechanical power demand and reduce the threshold temperature in sections of the period of operation with lower mechanical power demand.

The engine may comprise an air flow that is compressed and mixed with the fuel for combustion or oxidation, and a portion of the air flow is removed prior to combustion or oxidation, to provide cooling air for cooling parts of the engine. The control system may be further arranged to: vary a proportion of the air flow removed for cooling air over the period of operation.

The control system may be arranged to: when the engine temperature is below a second threshold temperature, lower than the threshold temperature, keeping the relative fractions of the total mass flow rate of fuel represented by the first mass flow rate and the second mass flow rate constant; and when the engine temperature is above the second threshold temperature, varying the relative fractions of the total mass flow rate of fuel represented by the first mass flow rate and the second mass flow rate to keep the engine temperature below the threshold temperature.

The relative fractions of the total mass flow rate of fuel represented by the first mass flow rate and the second mass flow rate may be controlled to keep the engine temperature substantially constant for at least a section of a period of operation.

The mechanical power demand of the engine may vary over the section of the period of operation in which the engine temperature is kept substantially constant by control of the relative fractions of the total mass flow rate of fuel represented by the first mass flow rate and the second mass flow rate.

The engine may comprise an electrical generator powered by operation of the engine, wherein an electrical power drawn by the generator varies over a section of the period of operation. The control system may be further arranged to: control the relative fractions of the total mass flow rate of fuel represented by the first mass flow rate and the second mass flow rate, based on the engine temperature and the electrical demand.

The mechanical power may be maintained as constant for the section of the period of operation over which the relative fractions of the total mass flow rate of fuel represented by the first mass flow rate and the second mass flow rate are controlled based on the engine temperature and the electrical demand.

The control system may be further arranged to start the engine using the second fuel based on an ambient temperature.

The engine temperature may be determined for a hottest part in the engine, for example wherein the engine temperature is determined at an exit of a chamber in which combustion or oxidation of the fuel occurs.

The first fuel and second fuel may be selected from hydrocarbon fuels and non-hydrocarbon fuels.

At least the second fuel may comprise a non-hydrocarbon fuel.

The first fuel and second fuel may comprise a fuel selected from kerosene, methane, hydrogen, ammonia, and mixtures of kerosene, methane, hydrogen and ammonia, and wherein the first and second fuel are selected such that for a fixed amount of extracted work, the second fuel results in a lower engine temperature.

The engine may be a gas turbine engine.

The engine may be an aircraft engine.

According to a second aspect, there is provided a method of operating an engine system in which mechanical power is generated by combustion or oxidation of fuel in an engine, the method comprising: providing a first fuel from a first fuel store to an engine at a first flow rate; providing a second fuel from a second fuel store to the engine at a second flow rate, wherein the first flow rate and second flow rate contribute to a total flow rate of fuel to the engine; and controlling the relative fractions of the total flow rate of fuel to the engine represented by the first and second flow rates according to the required power output of the engine such that the relative fraction of the total flow rate of fuel to the engine represented by the second flow rate increases with increasing required power output of the engine for at least part of a period of operation of the engine, wherein the first and second fuels are selected such that operation of the engine using only the second fuel results in a lower engine temperature than operation of the engine using only the first fuel, when producing the same amount of mechanical power and/or wherein the second fuel has a lower specific energy than the first fuel and/or wherein the second fuel produces more water during combustion than the first fuel per unit of fuel energy released during combustion.

According to a third aspect, there is provided a machine readable medium containing instructions which, when read by a machine, cause the machine to control a fuel distribution system of an engine system to perform the method of the second aspect.

According to a fourth aspect, there is provided a method of operating an engine system in which mechanical power is generated by combustion or oxidation of a fuel in an engine, the method comprising: providing a first fuel from a first fuel store to the engine at a first mass flow rate; providing a second fuel from a second fuel store to the engine at a second mass flow rate, wherein the first mass flow rate and second mass flow rate contribute to a total mass flow rate of fuel to the engine; and controlling the relative fractions of the total mass flow rate of fuel represented by the first mass flow rate and the second mass flow rate, based on an engine temperature.

The relative fractions of the total mass flow rate of fuel represented by the first mass flow rate and the second mass flow rate may be controlled to keep the engine temperature below a threshold temperature for at least a section of a period of operation.

The threshold may be determined for each period of operation, and may be determined based on a length of the period of operation.

The threshold may be a first temperature for a first period of operation having a first length and a second temperature for a second period of operation having a second length. The second length may be greater than the first length, and the second temperature may be higher than the first temperature.

The threshold temperature may be variable in different sections of the period of operation.

The threshold temperature may be increased in sections of the period of operation with higher mechanical power demand and may be reduced in sections of the period of operation with lower mechanical power demand.

The engine may comprise an air flow that is compressed and mixed with the fuel for combustion or oxidation, and a portion of the air flow may be removed prior to combustion or oxidation, to provide cooling air for cooling parts of the engine.

The method may further comprise: varying a proportion of the air mass flow of the cooling air over the period of operation.

The method may further comprise, when the engine temperature is below a second threshold temperature, lower than the threshold temperature, keeping the relative fractions of the total mass flow rate of fuel represented by the first mass flow rate and the second mass flow rate constant; and when the engine temperature is above the second threshold temperature, varying the relative fractions of the total mass flow rate of fuel represented by the first mass flow rate and the second mass flow rate to keep the engine temperature below the threshold temperature.

The relative fractions of the total mass flow rate of fuel represented by the first mass flow rate and the second mass flow rate may be controlled to keep the engine temperature substantially constant for at least a section of a period of operation.

The mechanical power demand of the engine may vary over the section of the period of operation in which the engine temperature is kept substantially constant by control of the relative fractions of the total mass flow rate of fuel represented by the first mass flow rate and the second mass flow rate.

An electrical power drawn by a generator powered by the engine may vary over at least a section of the period of operation.

The method may further comprise controlling the relative fractions of the total mass flow rate of fuel represented by the first mass flow rate and the second mass flow rate, based on the engine temperature and the electrical demand.

The mechanical power may be maintained as constant for the section of the period of operation over which the relative fractions of the total mass flow rate of fuel represented by the first mass flow rate and the second mass flow rate are controlled based on the electrical demand.

The method may further comprise controlling the relative fractions of the total mass flow rate of fuel represented by the first mass flow rate and the second mass flow rate to change the engine temperature at a first rate of change, whilst maintaining constant mechanical power.

The temperature of the engine may be varied at constant mechanical power prior to a period of increased or decreased mechanical power demand to pre-warm or pre-cool the engine. The first rate of change may be slower than the rate of change of the engine temperature resulting from the change in mechanical power demand without pre-warming or pre-cooling.

The method may further comprise, during a period of acceleration, controlling the relative fractions of the total mass flow rate of fuel represented by the first mass flow rate and the second mass flow rate based on the engine temperature and a surge margin.

The engine may comprise at least one compressor and/or turbine section. The relative fractions of the total mass flow rate of fuel represented by the first mass flow rate and the second mass flow rate may be controlled to minimise a tip clearance of blades in the at least one compressor and/or turbine section, whilst maintaining non-zero tip clearance in all compressor and turbine sections.

The engine may comprise a plurality of compressor and/or turbine sections, each having different tip clearance. The relative fractions of the total mass flow rate of fuel represented by the first mass flow rate and the second mass flow rate may be controlled to maintain a non-zero tip clearance of blades in a section having the smallest tip clearance.

The engine temperature may be determined at a different point to the tip clearance that is controlled by varying the relative fractions of the total mass flow rate of fuel represented by the first mass flow rate and the second mass flow rate.

The engine temperature may be determined for a hottest part in the engine, for example wherein the engine temperature is determined at an exit of a chamber in which combustion or oxidation of the fuel occurs.

The engine temperature may be either measured directly, or predicted based on a model of the engine and period of operation, or inferred from measurement of other parameters.

The first and second fuels may be selected such that operation of the engine using only the second fuel results in a lower engine temperature than operation of the engine using only the first fuel, when producing the same amount of work.

The first fuel and second fuel may be selected from hydrocarbon fuels and non-hydrocarbon fuels, At least the second fuel may comprise a non-hydrocarbon fuel.

The first fuel and second fuel may comprise a fuel selected from kerosene, methane, hydrogen, ammonia, and mixtures of kerosene, methane, hydrogen and ammonia. The first and second fuel may be selected such that for a fixed amount of extracted work, the second fuel results in a lower engine temperature.

The method may further comprise: providing a third fuel from a third fuel store to the engine at a third mass flow rate, wherein the first mass flow rate, the second mass flow rate and the third mass flow rate contribute to the total mass flow rate of fuel to the engine; and controlling the relative fractions of the total mass flow rate of fuel represented by the first mass flow rate, the second mass flow rate, and the third mass flow rate based on an engine temperature and optionally one or more of a mechanical power demand and/or an electrical power demand on a generator driven by the engine.

According to a fifth aspect, there is provided a machine readable medium containing instructions which, when read by a machine, cause the machine to control a fuel distribution system of an engine system to perform the method of the fourth aspect.

According to a sixth aspect, there is provided an engine system comprising: a first fuel store; a second fuel store; an engine arranged to produce mechanical power by combustion or oxidation of a fuel in an engine; a fuel distribution system arranged to deliver fuel from the first and second fuel stores to the engine, the first fuel delivered at a first mass flow rate, the second fuel delivered at a second mass flow rate, the first and second mass flow rates contributing to a total mass flow rate of fuel to the engine; and a control system arranged to control the relative fractions of the total mass flow rate of fuel to the engine represented by the first mass flow rate and the second mass flow rate, based on an engine temperature.

The control system may be further arranged to control the relative fractions of a total mass flow rate of fuel to the engine represented by the first mass flow rate and the second mass flow rate, based on the engine temperature and one or more of a mechanical power demand and/or an electrical power demand on a generator driven by the engine.

The engine may be a gas turbine engine. In one example, the engine may be an aircraft engine.

According to a seventh aspect, there is provided a method of operating an engine system in which mechanical power is generated by combustion or oxidation of a fuel in an engine, the method comprising: providing a first fuel from a first fuel store to an engine at a first mass flow rate; providing a second fuel from a second fuel store to the engine at a second mass flow rate, and wherein the first mass flow rate and second mass flow rate contribute to a total mass flow rate of fuel to the engine; and during a period of acceleration of the engine, increasing the relative fraction of the total mass flow rate of fuel represented by the second mass flow rate in order to control a surge margin of one or more compressor of the engine, wherein the second fuel is selected to have a higher specific energy than the first fuel and to release a greater mass of water per unit mass of fuel than the first fuel.

The method may comprise: increasing the relative fraction of the total mass flow rate of fuel represented by the second mass flow rate during an initial portion of the period of acceleration.

The method may comprise: reducing the relative fraction of the total mass flow rate of fuel represented by the second mass flow rate during a final portion of the period of acceleration.

The method may comprise: controlling the relative fractions of the total mass flow rate of fuel provided by the first mass flow rate and second mass flow rate to increase the surge margin compared to operation using the first fuel only.

No handling bleeds may be opened during the acceleration.

The method may comprise: controlling the relative fractions of the total mass flow rate of fuel provided by the first mass flow rate and second mass flow rate such that: the surge margin is the same as operating on the first fuel only; and the rate of acceleration is increased compared to operation using the first fuel only.

The first fuel and second fuel may be selected from hydrocarbon fuels and non-hydrocarbon fuels.

At least the second fuel may comprise a non-hydrocarbon fuel.

The first fuel and second fuel may comprise a fuel selected from kerosene, methane, hydrogen, ammonia, and mixtures of kerosene, methane, hydrogen and ammonia.

If the first fuel comprises ammonia or a mixture including ammonia as the predominant component, the second fuel may comprise any one of kerosene, methane or hydrogen, or a mixture comprising kerosene, methane or hydrogen as the predominant component.

If the first fuel comprises kerosene or a mixture including kerosene as the predominant component, the second fuel may comprise methane or hydrogen, or a mixture comprising methane or hydrogen as the predominant component.

If the first fuel comprises methane or a mixture including methane as the predominant component, the second fuel may comprise hydrogen, or a mixture comprising hydrogen as the predominant component.

The method may comprise: starting the engine using the second fuel based on an ambient temperature.

According to an eighth aspect, there is provided a machine readable medium containing instructions which, when read by a machine, cause the machine to control a fuel distribution system of an engine system to perform the method of the seventh aspect.

According to a ninth aspect, there is provided an engine system comprising: a first fuel store; a second fuel store; an engine arranged to produce mechanical power by combustion or oxidation of a fuel in an engine; a fuel distribution system arranged to deliver fuel from the first and second fuel stores to the engine, the first fuel delivered at a first mass flow rate, the second fuel delivered at a second mass flow rate, the first and second mass flow rates contributing to a total mass flow rate of fuel to the engine; and a control system arranged to increase the relative fraction of the total mass flow rate of fuel represented by the second mass flow rate during a period of acceleration of the engine, in order to control a surge margin of the engine, wherein the second fuel is selected to have a higher specific energy than the first fuel and to release a greater mass of water per unit mass of fuel than the first fuel.

The control system may be arranged to: increase the relative fraction of the total mass flow rate of fuel represented by the second mass flow rate during an initial portion of the period of acceleration.

The control system may be arranged to: reduce the relative fraction of the total mass flow rate of fuel represented by the second mass flow rate during a final portion of the period of acceleration.

The control system may be arranged to: control the relative fractions of the total mass flow rate of fuel provided by the first mass flow rate and second mass flow rate to increase the surge margin compared to operation using the first fuel only.

No handling bleeds may be opened during the acceleration.

The control system may be arranged to: control the relative fractions of the total mass flow rate of fuel provided by the first mass flow rate and second mass flow rate such that: the surge margin is the same as operating on the first fuel only; and the rate of acceleration is increased compared to operation using the first fuel only.

The first fuel and second fuel may be selected from hydrocarbon fuels and non-hydrocarbon fuels.

At least the second fuel may comprise a non-hydrocarbon fuel.

The first fuel and second fuel may comprise a fuel selected from kerosene, methane, hydrogen, ammonia, and mixtures of kerosene, methane, hydrogen and ammonia.

If the first fuel comprises ammonia or a mixture including ammonia as the predominant component, the second fuel may comprise any one of kerosene, methane or hydrogen, or a mixture comprising kerosene, methane or hydrogen as the predominant component.

If the first fuel comprises kerosene or a mixture including kerosene as the predominant component, the second fuel may comprise methane or hydrogen, or a mixture comprising methane or hydrogen as the predominant component.

If the first fuel comprises methane or a mixture including methane as the predominant component, the second fuel may comprise hydrogen, or a mixture comprising hydrogen as the predominant component.

The engine may be a gas turbine engine.

The engine may be an aircraft engine.

According to a further aspect, there is provided an aircraft propulsion system comprising: a first fuel store of a first fuel; a second fuel store of a second fuel; an engine arranged to produce mechanical power by combustion or oxidation of fuel in the engine, the engine comprising: a fan arranged to draw air into the engine; a core engine arranged to receive a portion of the air drawn in by the fan, the core engine arranged to generate the mechanical power to drive the fan by combustion or oxidation of the fuel; a bypass air flow arranged to receive a portion of the air drawn in by the fan; and an exit nozzle of the bypass air flow, the exit nozzle having a variable area, the aircraft propulsion system further comprising: a fuel distribution system arranged to deliver fuel from the first and second fuel stores to the engine, the first fuel delivered at a first flow rate, the second fuel delivered at a second flow rate, the first and second flow rates contributing to a total flow rate of fuel to the engine; and a control system arranged to: control the relative fractions of the total flow rate of fuel to the engine represented by the first and second flow rates according to the required power output of the engine such that the relative fraction of the total flow rate of fuel to the engine represented by the second flow rate increases with increasing required power output of the engine; and vary the size of the variable area fan nozzle based on the fan pressure ratio and/or the relative proportion of the total flow provided by the second fuel.

The control system may be arranged to vary the size of the variable area fan nozzle to maintain the fan pressure ratio at a desired value, or within a desired range, or below a desired threshold.

The control system may be arranged to increase the size of the variable area fan nozzle as the relative proportion of the total flow provided by the second fuel increases and decrease the size of the variable area fan nozzle as the relative proportion of the total flow provided by the second fuel decreases.

According to yet a further aspect, there is provided a method of operating an aircraft propulsion system, the method comprising: providing a first fuel from a first fuel store to an engine at a first flow rate; providing a second fuel from a second fuel store to the engine at a second flow rate, wherein the first flow rate and second flow rate contribute to a total flow rate of fuel to the engine; controlling the relative fractions of the total flow rate of fuel to the engine represented by the first and second flow rates; and controlling an area of a variable area nozzle of the engine based on the fan pressure ratio and/or the relative proportion of the total flow provided by the second fuel.

The method may include varying the size of the variable area fan nozzle to maintain the fan pressure ratio at a desired value, or within a desired range, or below a desired threshold.

The method may include: increasing the size of the variable area fan nozzle as the relative proportion of the total flow provided by the second fuel increases and decreasing the size of the variable area fan nozzle as the relative proportion of the total flow provided by the second fuel decreases.

According to a further aspect, there is provided a method of cooling an engine, the method comprising using a fuel of the engine as a heat sink. The fuel may be used as a heat sink for compressor intercooling or for pre-cooling air extracted from compressor stages of the engine before providing to turbine stages or a combustor.

According to a further aspect, there is provided an engine system comprising: a first fuel store of a first fuel; a second fuel store of a second fuel; an engine arranged to produce mechanical power by combustion or oxidation of fuel in the engine, a fuel distribution system arranged to deliver fuel from the first and second fuel stores to the engine, the first fuel delivered at a first flow rate, the second fuel delivered at a second flow rate, the first and second flow rates contributing to a total flow rate of fuel to the engine; and a control system arranged to: control the relative fractions of the total flow rate of fuel to the engine represented by the first and second flow rates, wherein at least one of the first fuel and second fuel is used as a heat sink for cooling of the engine. Optionally, ducts carrying either the first fuel or second fuel may be provided in a region of a heat exchanger for providing compressor intercooling between compressors of the engine. Optionally, the engine may comprise a cooling system arranged to withdraw cooling air from compressor stages of the engine, and provide the air to turbine stages and/or a combustor. It may be that heat is transferred from the cooling air to the first fuel or second fuel to pre-cool the cooling air.

According to another aspect of the invention, there is provided an engine system comprising: a first fuel store of a first fuel; a second fuel store of a second fuel; an engine arranged to produce mechanical power by combustion or oxidation of fuel in the engine, a fuel distribution system arranged to deliver fuel from the first and second fuel stores to the engine, the first fuel delivered at a first flow rate, the second fuel delivered at a second flow rate, the first and second flow rates contributing to a total flow rate of fuel to the engine; an electrical generator driven by the engine; and a control system arranged to: control the relative fractions of the total flow rate of fuel to the engine represented by the first and second flow rates based on an electrical demand. The relative proportion of the total flow rate provided by the second fuel may increase as electrical demand increases.

According to a further aspect, there is provided a method of operating an engine system, the method comprising: providing a first fuel from a first fuel store to an engine at a first flow rate; providing a second fuel from a second fuel store to the engine at a second flow rate, wherein the first flow rate and second flow rate contribute to a total flow rate of fuel to the engine; generating electrical power using the engine; and controlling the relative fractions of the total flow rate of fuel to the engine represented by the first and second flow rates based on an electrical demand. The relative proportion of the total flow rate provided by the second fuel may increase as electrical demand increases.

According to another aspect, there is provided a method of operating an engine, the method comprising: providing a first fuel from a first fuel store to an engine at a first flow rate; providing a second fuel from a second fuel store to the engine at a second flow rate, wherein the first flow rate and second flow rate contribute to a total flow rate of fuel to the engine; generating electrical power using the engine; and controlling the relative fractions of the total flow rate of fuel to the engine represented by the first and second flow rates based on an ambient temperature during a start-up of the engine, It may be that for lower ambient temperature, the relative fractions of the total flow rate of fuel to the engine represented by the second flow rate increase compared to higher ambient temperature.

According to still another aspect, there is provided an engine system comprising: a first fuel store of a first fuel; a second fuel store of a second fuel; an engine arranged to produce mechanical power by combustion or oxidation of fuel in the engine, a fuel distribution system arranged to deliver fuel from the first and second fuel stores to the engine, the first fuel delivered at a first flow rate, the second fuel delivered at a second flow rate, the first and second flow rates contributing to a total flow rate of fuel to the engine; an electrical generator driven by the engine; and a control system arranged to: control the relative fractions of the total flow rate of fuel to the engine represented by the first and second flow rates based on an ambient temperature during a start-up of the engine, It may be that for lower ambient temperature, the relative fractions of the total flow rate of fuel to the engine represented by the second flow rate increase compared to higher ambient temperature.

At least some of the following examples are described with reference to an aircraft propulsion system. As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan (or gas turbine engine) is designed to operate. This may mean, for example, the conditions at which the fan (or gas turbine engine) is designed to have optimum efficiency.

In use, a gas turbine aircraft engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Note that the terms "low pressure turbine" and "low pressure compressor" as used herein may be taken to mean the lowest pressure turbine stages and lowest pressure compressor stages (i.e. not including the fan) respectively and/or the turbine and compressor stages that are connected together by the interconnecting shaft with the lowest rotational speed in the engine (i.e. not including a gearbox output shaft that drives the fan). In some literature, the "low pressure turbine" and "low pressure compressor" referred to herein may alternatively be known as the "intermediate pressure turbine" and "intermediate pressure compressor". Where such alternative nomenclature is used, the fan may be referred to as a first, or lowest pressure, compression stage. Likewise, the terms "high pressure turbine" and "high pressure compressor" as used herein may be taken to mean the highest pressure turbine stages and highest pressure compressor stages respectively and/or the turbine and compressor stages that are connected together by the interconnecting shaft with the highest rotational speed in the engine.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments of the invention are described below by way of example only and with reference to the accompanying drawings in which:

FIG. 4 is a second example of a propulsion system including the engine of FIG. 1.

DETAILED DESCRIPTION

Figure 1:
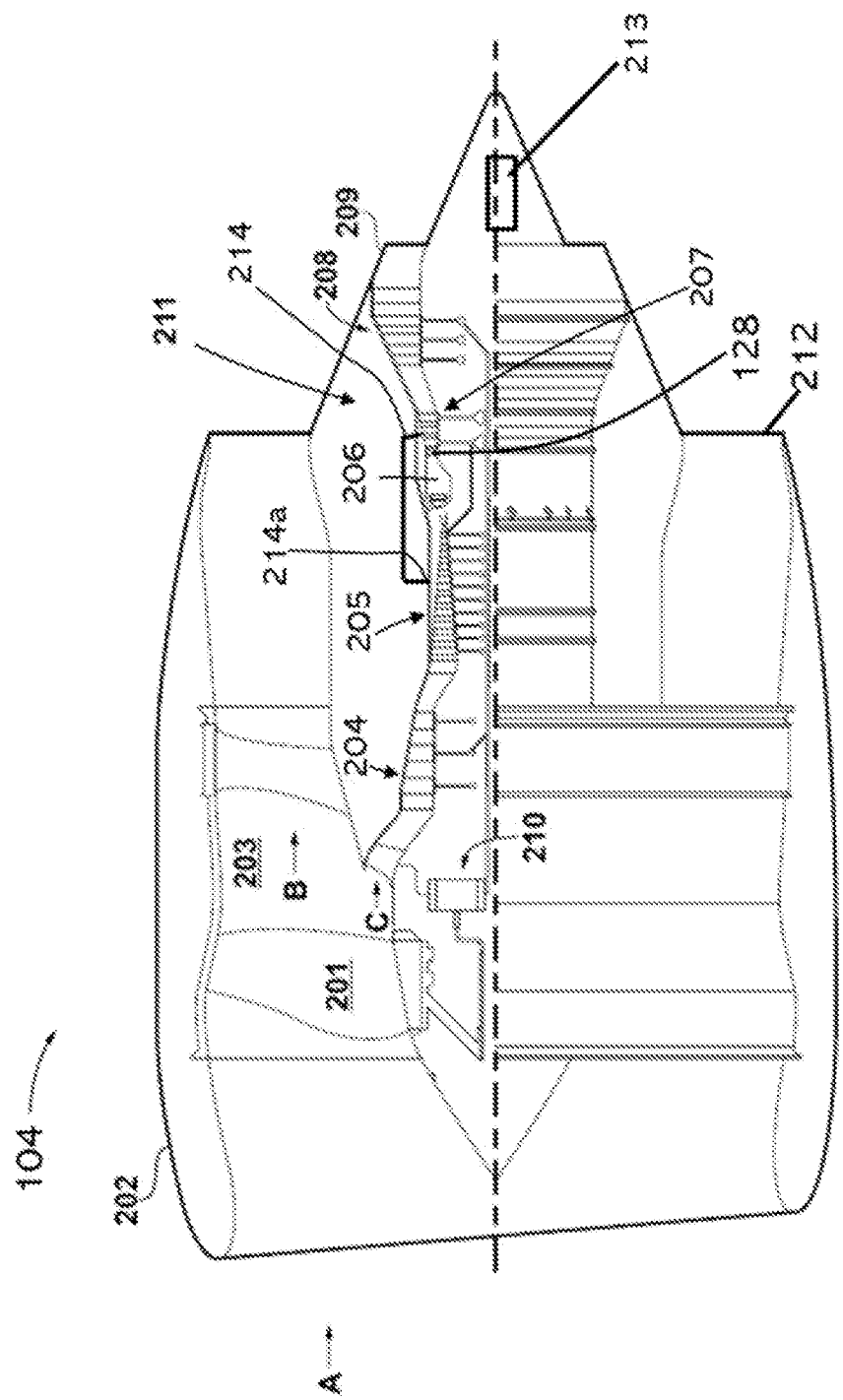
FIG. 1 is a schematic of a gas turbine aircraft engine.

FIG. 1 illustrates an example of a general arrangement for a turbofan gas turbine aircraft engine 104. The example shown is a two shaft engine 104 in which the fan 201 is driven by a gearbox 210. This engine configuration is given by way of example only, and it will be appreciated that the engine 104 may have any suitable other configuration.

The engine comprises a ducted fan 201 located in a nacelle 202. The fan 201 receives intake air A and generates two airflows: a bypass flow B which passes axially through a bypass duct 203 and a core flow C which enters a core gas turbine engine 211.

The core gas turbine engine 211 comprises, in axial flow series, a low pressure compressor 204, a high pressure compressor 205, a combustor 206, a high pressure turbine 207, and a low pressure turbine 208. Each compressor 204, 205 and turbine 207, 208 may have one or more stages (rotor) and each turbine 207, 208 may be operated between a pair of choked nozzles. In some examples, only a single turbine may be provided, and the other turbine may be omitted.

In operation, the core flow C is compressed by the low pressure compressor 204 and is then directed into the high pressure compressor 205 where further compression takes place. The compressed air exhausted from the high pressure compressor 205 is directed into the combustor 206 where it is mixed with fuel and combusted.

Following combustion, the resultant hot combustion products are discharged and expand through, and thereby drive, the high pressure turbine 207 and in turn the low pressure turbine 208 before being exhausted via a core nozzle 209 to provide a small proportion of the overall thrust.

The fan 201 is attached to and driven by the low pressure turbine 208 via a first shaft (not shown) and reduction gearbox 210. In the present embodiment, the reduction gearbox 210 takes the form of an epicyclic gearbox. The first shaft also interconnects the low pressure turbine 208 and the low pressure compressor 204 such that the low pressure compressor 204 is also driven by the low pressure turbine 208. The high pressure turbine 207 drives the high pressure compressor 205 by a second interconnecting shaft (not shown).

In operation, one or more of the high pressure turbine 207, and low pressure turbine 208 may require cooling, especially at higher power outputs. Where each turbine 207, 208 has multiple stages, some or all of the stages may be cooled.

For cooling the turbines 207, 208, a portion of the core flow C is extracted from either the low pressure compressor 204 and/or high pressure compressor 205 via a cooling duct 214 and is directed into the air flow of the high pressure turbine 207 and/or low pressure turbine 208 as required, bypassing the combustor 206. Cooling air may be extracted from a number of different places in the compressor(s) 204, 205, to ensure the cooling air is of sufficient pressure but not too high pressure.

Typically, at least 15% of the air mass flow C through the core gas turbine engine 211 (expressed as a percentage of the air mass flow entering the core gas turbine engine 211) is extracted for cooling. In some examples, the amount of the air mass flow extracted for cooling is variable using a variable opening or constriction 214a in the duct 214.

In some examples, the combustor 206 may require cooling. For cooling of the combustor 206, exit air from the compressor 205 may be used instead of or as well as air from the cooling duct 214. Furthermore, in some examples, air extracted from the low pressure compressor 204 may be used to cool the high pressure compressor 205.

Mechanical power may also be extracted from one or more engine spools of the turbofan engine 104 to drive auxiliary systems of the aircraft, for example via an auxiliary gearbox or an electrical generator 213 coupled, directly or indirectly, to the either of the shafts of the engine 104 or to one of the compressors 204, 205 or turbines 207, 208. The electrical power may drive auxiliary propulsion systems and/or other electrical systems of the aircraft.

Other gas turbine engines 104 to which the present disclosure may be applied may have alternative configurations. For example, such engines 104 may have an alternative number of compressors 204, 205 and/or turbines 207, 208 and/or an alternative number of interconnecting shafts.

By way of further example, the gas turbine engine 104 shown in FIG. 1 has a split flow nozzle meaning that the flow through the bypass duct 203 has its own nozzle 212 that is separate to and radially outside the core engine nozzle 209. However, this is not limiting, and any aspect of the present disclosure may also apply to engines 104 in which the flow through the bypass duct 203 and the flow through the core gas turbine engine 211 are mixed, or combined, before (or upstream of) a single nozzle, which may be referred to as a mixed flow nozzle. One or both nozzles (whether mixed or split flow) may have a fixed or variable area.

Whilst the below examples relate to a turbofan engine 104, the disclosure may apply, for example, to any type of gas turbine engine or other engine which produces thrust (propulsive power or motive power) by combusting or oxidation of fuel. For example the engine 104 may be a reciprocating engine (including a propeller) or a turboprop engine (including a propeller), or an open rotor engine (in which the fan stage is not surrounded by a nacelle). Another possibility is a gas turbine engine arranged to drive an electrical generator and an electric motor electrically connected to the generator and arranged to drive a propeller. The gas turbine engine 104 may also be arranged in the "pusher" configuration, in which the fan 201 is located downstream of the core gas turbine engine 211. The engine of the engine system may comprise an electric motor arranged to drive a shaft of the engine, such that engine has an electrical power input in addition to an input flow of chemical energy. The combustor 206 of the engine 104 may be staged or unstaged.

The geometry of the gas turbine engine 104, and components thereof, is defined by a conventional axis system, comprising an axial direction (which is aligned with the rotational axis), a radial direction (in the bottom-to-top direction in FIG. 1), and a circumferential direction (perpendicular to the page in the FIG. 1 view). The axial, radial and circumferential directions are mutually perpendicular.

An epicyclic gearbox 210 is described by way of example only, and various alternatives are within the scope of the present disclosure. Purely by way of example, any suitable arrangement may be used for locating the gearbox 210 in the engine 104 and/or for connecting the gearbox 210 to the engine 104. By way of further example, the connections between the gearbox 210 and other parts of the engine 104 (such as the shafts, fan 201 and fixed structures) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used. Accordingly, the present disclosure extends to a gas turbine engine having any arrangement of gearbox styles (for example star or planetary), support structures, input and output shaft arrangement, and bearing locations.

It will be appreciated that in other examples, the engine 104 may not include a gearbox 210 and the fan 201 may be driven directly by one of the interconnecting shafts.

Various fuels may be used in the combustor 206 of the engine 104. For example, the fuel may be a hydrocarbon fuel such as kerosene or methane, or a non-hydrocarbon fuel such as hydrogen or ammonia. Table 1 below shows various properties of different example fuels.

TABLE 1 properties of engine fuels

| | Hydrogen mass fraction (%) | Specific Energy (MJ/kg) | H2O emission index (kg/kg) | Emissions of H2O (kg/MJ) |
|---|---|---|---|---|
| Kerosene | c. 13.5-15 | 42.8 | 1.25 | 0.0293 |
| Methane | 25.1 | 50 | 2.25 | 0.0449 |
| Hydrogen | 100 | 120 | 8.94 | 0.0745 |
| Ammonia | 17.8 | 18.6 | 1.59 | 0.0853 |

As shown in table 1, compared to hydrocarbons, hydrogen and ammonia release much more water per unit of fuel energy when combusted. Therefore, the specific heat capacity (Cp) of the resulting exhaust gases is correspondingly higher. Thus, for a given exhaust mass flow through one of the turbines 207, 208, a smaller temperature drop is required to extract the same amount of work (where the extracted work Q is given by $Q = W \times C_p \times \Delta T$, with W the mass flow rate through the turbine 207, 208).

For a turbine that operates between two choked nozzles, the pressure ratio is substantially constant at all operating points, and thus the temperature ratio is also substantially constant. With fuels such as hydrogen or ammonia, the reduction in ΔT leads to lower turbine inlet total temperature than would be the case for kerosene or other hydrocarbon fuels such as methane. In particular, the temperature at the combustor exit 128 (referred to as T40, the combustor outlet temperature) is reduced with hydrogen or ammonia compared to kerosene or methane, for the same turbine work. The combustor exit 128 is typically the hottest part of the engine 104, and thus often represents a limitation for engine configuration or operation, materials and the like.

A non-dimensional representation of the mass flow through the core gas turbine engine 211 is the flow Mach number, M, which is given by:

$$M = \left(\frac{W\sqrt{(T)}}{AP}\right) \times \left(\frac{P}{p}\right) \times \sqrt{\left(\frac{t}{T}\right)} \times \sqrt{\left(\frac{R}{\gamma}\right)}$$

Where W=mass flow rate, t=static temperature, T=stagnation temperature, p=static pressure, P=stagnation pressure, R=specific gas constant, γ=ratio of specific heats, A=cross-sectional area. An alternative, semi-non-dimensional, flow representation Q is sometimes used, where $Q = [W\sqrt{(T)}/AP]$.

As discussed above, the nozzle at the entrance to the high pressure turbine 207 is choked. Therefore, at the throat of the choked nozzle (the part of the nozzle with the smallest cross-sectional area) M is substantially constant (M=1). Assuming that the throat area of the nozzle is also a constant, then if the combustor exit temperature T40 is reduced, mass flow rate to the high pressure turbine 207 increases. This means that if combustor exit temperature T40 is reduced then more mass can pass into the high pressure turbine 207 at a given pressure, which (assuming the percentage pressure drop in the combustor 206 is substantially constant) means that the high pressure turbine 207 can pass more mass flow for a given pressure delivered from the high pressure compressor 205 (referred to as P30), corresponding to the same engine overall pressure ratio (OPR).

When running on hydrogen, the mass of fuel required per unit of fuel energy is substantially smaller than for kerosene. Thus the post-combustion mass flow per unit of pre-combustion (compressor delivery) mass flow will be materially lower than for kerosene. For a given OPR, the compressor delivery mass flow required to ensure that M remains constant at the throat of the nozzle of the high pressure turbine 207 is thus increased, due not only to the lower T40 to deliver the desired turbine work, but also due to the reduced fuel mass flow. Therefore the compressors 204, 205 deliver more mass flow for the same pressure ratio. In other words their operating points move further from their respective surge lines, and thus their surge margins increase.

When running on ammonia, the reduction in T40 is greater even than for hydrogen due to the greater water content in the exhaust per unit of fuel energy. Due to the lower specific energy of ammonia, the fuel mass flow will be greater than for hydrogen or kerosene to release the same amount of fuel energy.

Taking into account the temperature drop, air flow changes and changes in $\sqrt{(R/\gamma)}$, P/p, $\sqrt{(t/T)}$ at the throat of the nozzle of the high pressure turbine 207, it can be shown that at fuel-flow rates (mass flow rates) corresponding to relatively high power steady state operation, use of hydrogen materially increases the core mass flow C in the compressor stages at a given pressure ratio (relative to kerosene), while use of ammonia reduces it (again, relative to kerosene).

Therefore, by using fuels such as hydrogen or ammonia, the engine can be operated at a lower combustor exit temperature whilst extracting the same amount of turbine work, or greater turbine work can be extracted whilst maintaining the same combustor exit temperature.

For higher power outputs, the fuel-to-air ratio is typically increased, when operating on a single fuel. As the fuel-to-air ratio increases, T40 also increases, such that T40 typically reaches a maximum at the maximum power output. For any hydrogen-containing fuel, as the fuel-to-air ratio increases, the exhaust products contain a greater proportion of water vapour. Therefore, the reduction in combustor exit temperature obtained when using hydrogen or ammonia compared to kerosene is larger at higher power outputs. Therefore, at high thrust settings, use of hydrogen and/or ammonia can yield a material reduction in combustor exit temperature T40 relative to operation with kerosene at the same thrust setting.

However, due to the heavy storage tanks required for hydrogen or ammonia and due also to the inherently low specific energy of ammonia, these fuels are not suitable to be used on their own for medium or long range flight missions. Therefore, a combination of hydrocarbon fuels (e.g. kerosene or methane) and non-hydrocarbon fuels (such as hydrogen or ammonia) may be used, in order to keep the low carbon advantages of hydrogen and ammonia but also extending the range of a vehicle powered by the engine 104.

The combustor 206 of the turbofan engine 104 may have any suitable arrangement for combusting a first fuel and a second fuel or a combination of the first fuel and the second fuel. There may be a single annular combustor 206 having two or more different burner types arranged alternately around the circumference of the combustor 206, or two or more different burner types may be arranged in two concentric rings around the circumference of a combustor 206. Alternatively, there may be a single annular combustor 206 having multiple burners of a single type, each burner comprising two or more fuel spray nozzles or injectors, one for the first fuel and one for the second fuel. Alternatively, a canned combustor 206 arrangement may be provided, with some cans burning the first fuel and some cans burning the second fuel. Another option is that the turbofan engine 104 may have two combustors 206 in series with no turbomachinery in between the two combustors 206, or there may be two combustors 206 in series, with the second combustor 206 lying between two distinct stages of high pressure (HP) turbine which are mounted on the same spool as each other and which therefore have a common rotational speed. Alternatively, there may be two combustors 206 in series, the second combustor 206 lying between an HP turbine and an intermediate pressure (IP) or low pressure (LP) turbine, the two turbines not being constrained to run at the same speed as each other. Another option is for the fuel to be premixed prior to the combustor 206.

Figure 2:
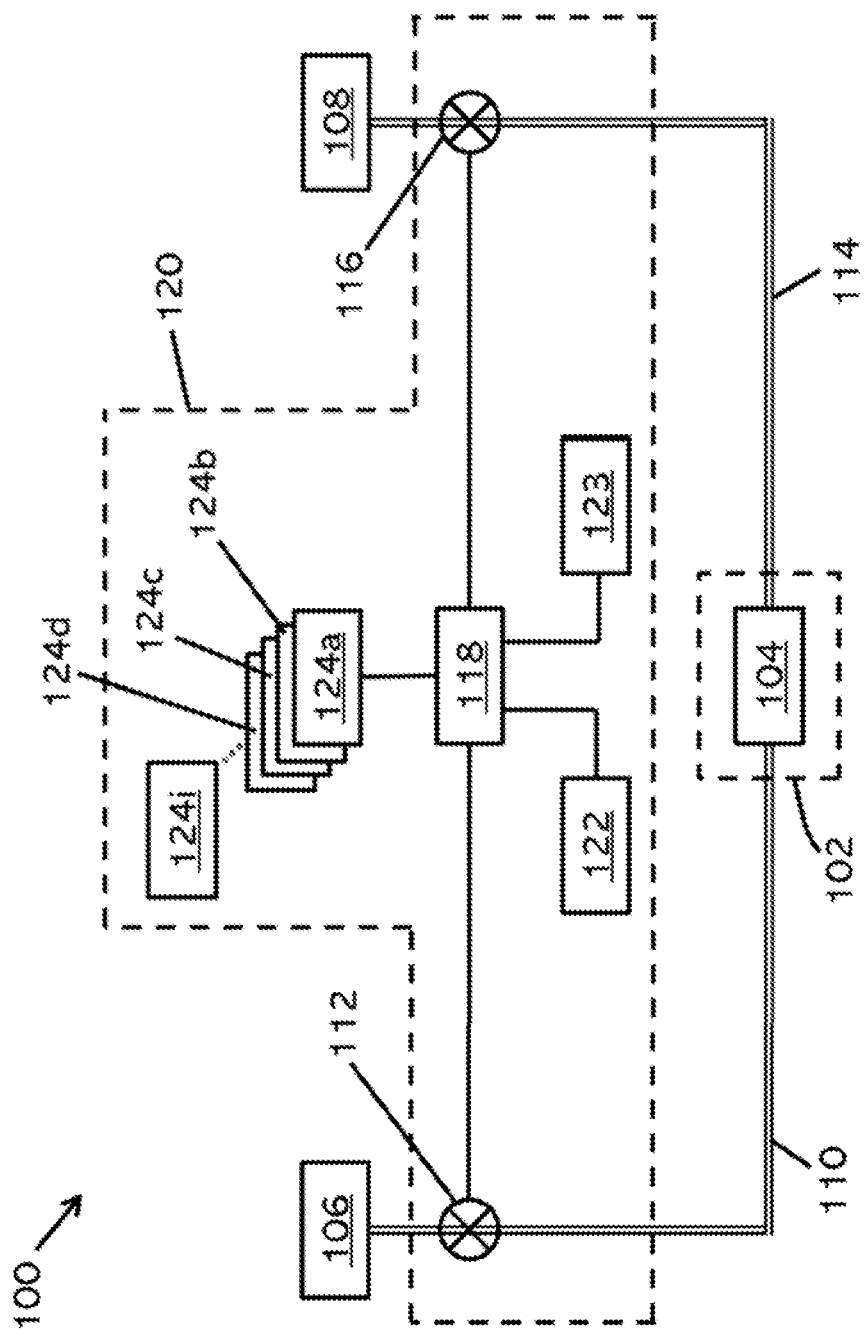
FIG. 2 is a first example of a propulsion system including the engine of FIG. 1.

FIG. 2 shows an aircraft propulsion system 100 incorporating the dual fuel engine 104 of FIG. 1 in an engine system 102.

The propulsion system 100 includes a first fuel tank 106 storing the first fuel. The first fuel is conveyed from the first fuel tank 106 to the engine 104 through a first fuel duct 110. The first fuel duct 110 includes a first valve 112 (or flow regulator) for adjusting the mass flow rate $W_1$ of the first fuel from the first fuel tank 106 to the engine 104 during operation.

The propulsion system 100 also includes a second fuel tank 108 storing the second fuel. The second fuel is conveyed from the second fuel tank 108 to the engine 104 through a second fuel duct 114. The second fuel duct 114 includes a second valve 116 (or flow regulator) for adjusting the mass flow rate $W_2$ of the second fuel from the second fuel tank 108 to the engine 104 during operation.

Optionally, the first and second fuels may be provided into the combustor 206 by a pump or the like (not shown).

In the following examples, the second fuel is any fuel that results in a lower combustor exit temperature T40 than is produced by the first fuel for producing the same amount of work (at any level of work). As discussed above, the lower temperature may be achieved by a higher mass of water vapour per unit of fuel energy, which increases the specific heat capacity Cp of the exhaust products. In addition or alternatively, the combustor exit temperature T40 may be reduced if the second fuel has a lower specific energy, requiring a higher mass flow rate of fuel to release the same amount of energy during combustion. In some examples, the first fuel may be taken from hydrocarbon fuels such as kerosene or methane, and the second fuel may be taken from non-hydrocarbon fuels such as hydrogen or ammonia. In other examples, the selection of the fuel may be based on other factors, as discussed below.

In operation, the total mass flow rate of fuel to the engine 104 ($W_{tot}$) is the combination of the mass flow rate of fuel from the first fuel tank 106 (the first mass flow rate $W_1$) and the mass flow rate of fuel from the second fuel tank 108 (the second mass flow rate $W_2$). The fraction of the total mass flow rate represented by the mass flow rate of fuel from the first fuel tank 106 may be represented by x, where $0 \leq x \leq 1$, whilst the fraction of the mass flow rate of fuel from the second fuel tank 108 may be represented by 1−x. Therefore:

$$W_1 = xW_{tot}; \text{ and}$$

$$W_2 = (1-x)W_{tot}.$$

The first fuel valve 112 and second fuel valve 116 allow variation of the first and second mass flow rates over a range of values. This allows for variation of both $W_{tot}$ and $W_1$ and $W_2$. The first and second mass flow rates may be continuously variable over a range of operation between a minimum and maximum, or may be variable in step wise manner over the range. The minima and maxima may allow for variation of x between 0 and 1, and the range of the first flow rate may be different to the range of the second flow rate. On the other hand, x may only be varied within a predefined range. The range in which x may be varied may change with the thrust demand of the engine. For example, at higher thrust demand, the minimum value of x may be higher than at lower thrust demand and/or the maximum value of x may be higher at high thrust demand than low thrust demand. The fuels used may also influence the minimum and maximum value x can take. For example, where ammonia is used as one of the fuels, x may be varied within a range to avoid compositions with a higher ammonia content.

A controller 118 controls operation of the first fuel valve 112 and second fuel valve 116 to control the mass flow rates $W_1$, $W_2$, $W_{tot}$, as will be described in more detail below.

The controller 118 and fuel valves 112, 116 form part of a control system 120. The control system also includes sensors 122, 123, 124, for detecting various conditions of the ambient environment, engine 104 and aircraft. A first sensor 122 detects data corresponding to current and future thrust demand in the aircraft. The future thrust demand may be predicted based on a flight plan or an input by a pilot or the like. A second sensor 123 detects data corresponding to the forward velocity of the aircraft. Temperature sensors 124a-i detect or otherwise infer the temperature at various points in the engine 104. It will be appreciated that temperature sensors 124a-i may directly measure temperature, or may measure other parameters to allow temperature to be inferred. A first temperature sensor 124a monitors the combustor outlet temperature T40, the value of which is inferred from other measurements.

Data corresponding to other, non-motive, power required from the turbofan engine 122, such as mechanical power-offtake from one or more spools of the turbofan engine 104 required for driving an auxiliary gearbox and associated systems, is also input to the controller 118.

A flight mission of an aircraft/engine 104 (i.e. from switch-on, to take-off, to landing, to switch-off) may include a number of sections. A section can be distinguished from its neighbouring sections on the basis of flight time (e.g. a new section starts each second or each minute or every ten minutes), or on the basis of flight distance (e.g. a new section starts every mile or ten miles or 50 miles), or on the basis of a material change in any one or any combination of a number of parameters such as altitude, latitude, ambient static temperature, ambient relative humidity, aircraft velocity and required thrust.

Figure 3A:
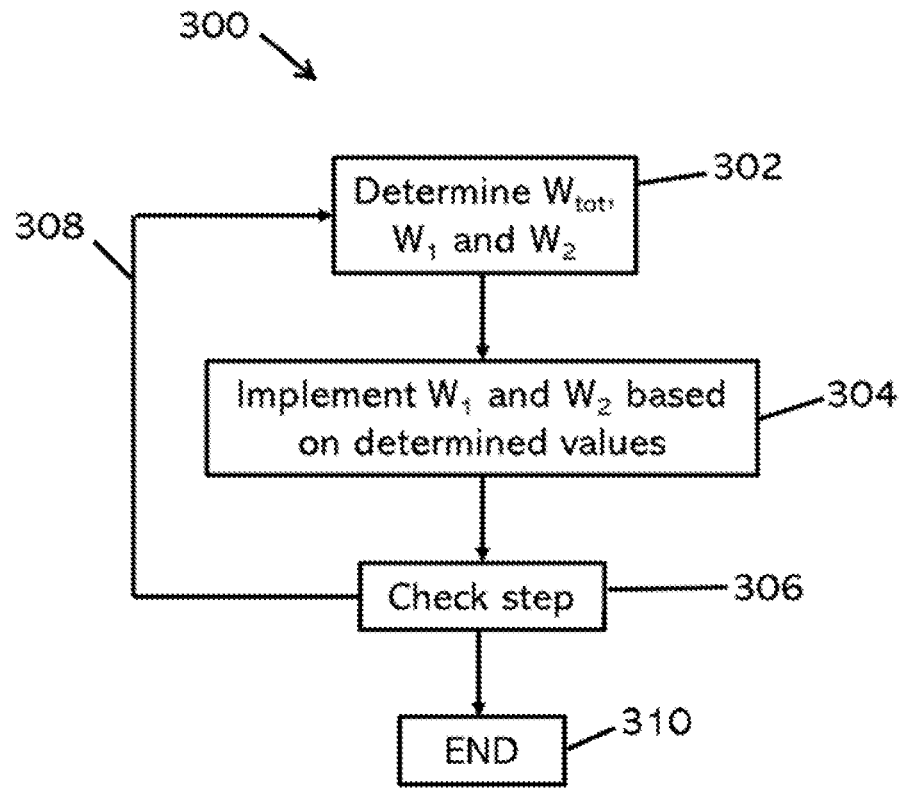
FIG. 3A is a flow chart showing a method of operating the propulsion system of FIG. 2.

FIG. 3A shows one example of a method 300 for operating the propulsion system 100 shown in FIG. 2 during a flight mission. In a first step 302, the values for $W_{tot}$, $W_1$ and $W_2$ are determined using models that will be described below. It will be appreciated that determining the mass flow rates $W_{tot}$, $W_1$, $W_2$ is a multi-dimensional problem based on a number of variables (such as desired thrust, environmental conditions, altitude, emissions and the like).

Figure 3B:
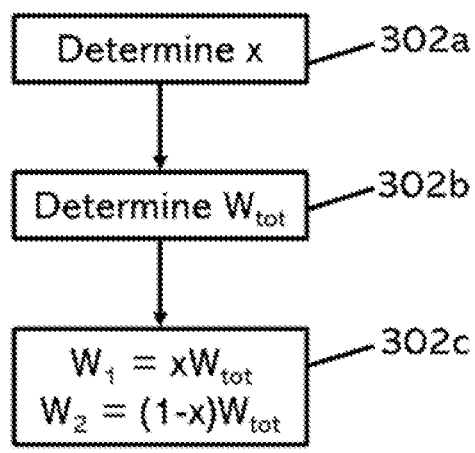
FIG. 3B is a flow chart showing the step of determining the different flow rates from FIG. 3A in more detail.

With reference to FIG. 3B determining the values for $W_{tot}$, $W_1$ and $W_2$ may be accomplished by a first step 302a of determining the desired combination of fuels (i.e. the value of x) based on the models below. As discussed above, x may take a value within a range. Within the available range of x, the value of x is determined based on the models discussed below.

In a second step 302b, the rate at which fuel energy should be provided to the combustor 206 is determined, hence allowing the total fuel flow rate $W_{tot}$ for the chosen fuel combination to be determined. It will be appreciated that the desired fuel energy will be based on a number of factors including desired thrust. It will further be appreciated that the desired fuel energy may also be based on the determined value of x.

In a final step 302c, the individual flow rates for each fuel $W_1$ and $W_2$ are determined from $W_{tot}$ and from x.

Returning to the method 300 of FIG. 3A, the determined first and second mass flow rates $W_1$, $W_2$ are implemented by operation of the flow valves 112, 116, for the duration of a current section in a second step 304.

It may be that the mass flow rates $W_1$, $W_2$ for each section of the flight mission are determined by the models discussed below. Alternatively, the models may be used for some of the sections. Furthermore, more than one model may be applied to a section. For example, multiple models may be active to help determine the operation and mass flow rates $W_1$, $W_2$.

After implementing the determined first and second mass flow rates $W_1$, $W_2$ the method proceeds to a check step 306. The method may wait (or loop) at the check step 306 until one of two criteria are met. In the event that a new section is started, the method 300 reverts to step 302 in a loop 308. Alternatively, if the end of the flight mission is detected, the method 300 ends at a final step 310.

In some examples, the value of $W_{tot}$, $W_1$ and $W_2$ may be constant in a section. In other examples, one or more of $W_{tot}$, $W_1$ and $W_2$ may be controlled to vary over a section in a predetermined manner.

In an alternative method of operation, the first and second mass flow rates $W_1$, $W_2$ are recalculated on a continuous basis throughout one or more sections of a flight. The steps of determining 302 values for $W_{tot}$, $W_1$ and $W_2$ and implementing 304 the values is looped at a refresh rate or frequency. It will be appreciated that this may be considered to be similar to the method 300 shown in FIG. 2, where the section length is set as the refresh rate.

In an alternative embodiment an optimal flight plan may be determined in advance of a proposed flight, or in advance of any remaining sections of an in-progress flight. The optimal flight plan includes a sequence of values for $W_{tot}$, $W_1$ and $W_2$ for each remaining section of the flight mission.

In some examples, the optimal flight plan is used as the basis for fuel loading prior to commencement of the flight, even if the optimal plan is not used during operation. In other examples, the optimal flight plan may be used through the flight, until a deviation from the plan is determined.

The mass flow rates $W_1$, $W_2$, $W_{tot}$ may be controlled according to a number of different models, as discussed below. The different models may be used in some or all of the different sections of the flight, or in only parts of sections.

In the models discussed below, the controller 118 varies the mass flow rates $W_1$, $W_2$, $W_{tot}$ based on the outputs from the sensors 122, 123, 124. In one example, the mass flow rates $W_1$, $W_2$, $W_{tot}$ may be varied based on the combustor exit temperature T40, inferred by temperature sensor 124a.

In a first model of determining the mass flow rates $W_1$, $W_2$, $W_{tot}$, a maximum threshold temperature is set for the combustor exit 128 ($T40_{max}$).

The controller 118 monitors the temperature at the combustor exit 128 through temperature sensor 124a, and varies the relative fraction of the total mass flow rate provided by each of the fuels in order to maintain the combustor exit temperature below the threshold.

For example, when the temperature approaches the threshold, relative flow rates of the first and second fuels $W_1$, $W_2$ are varied so that the second fuel provides a greater proportion of the fuel energy, to reduce the temperature. As a result of the different specific energies of the fuels, it may be that the total fuel flow rate $W_{tot}$ is also changed at the same time, with the relative fraction of the total flow rate $W_{tot}$ provided by each of the fuels also changing.

It may be that when the measured temperature is significantly below the threshold, the mass flow rates $W_1$, $W_2$, $W_{tot}$ are determined based on variables not including the temperature in other models, such as based on environmental output, efficiency and the like. When the measured temperature approaches the threshold, the temperature is then included in the determination. Alternatively, models of engine performance could be used to ensure the threshold temperature is never reached.

As discussed above, the amount of cooling air drawn through cooling duct 214 may be variable (for example, the duct 214 may include a variable opening 214a to allow control of the mass flow through the cooling duct 214). The flow of cooling air is expressed as a percentage of the air flow C entering the core gas turbine engine 211.

In one example, the value of the threshold temperature $T40_{max}$ may be fixed for a flight mission. Once the threshold temperature $T40_{max}$ is determined for a proposed flight mission, the mass flow of cooling air, as a percentage of the air flow C entering the core gas turbine engine 211, is determined and set.

In one case, the threshold temperature $T40_{max}$ may be set lower than would be reached in an engine operating at high power using the first fuel only (i.e. x=1). In this case, less cooling air is required to cool the core gas turbine engine 211. Therefore, the proportion of air drawn off for cooling can be reduced compared to an engine 104 running on the first fuel only. As a result, the engine generally operates more efficiently. The increased efficiency is seen even when there is no mass flow rate from the second fuel (i.e. x=1), as less air is taken from the compressor stages 204, 205 for cooling throughout the flight mission.

It will be appreciated that the threshold temperature $T40_{max}$ may be determined by a number of factors. For example, for short flights where the hydrogen/ammonia capacity may be sufficient to conduct most of the flight, the threshold temperature $T40_{max}$ would be set to a low value. For longer flights, where hydrogen/ammonia may represent only a small proportion of on-board fuel energy, the threshold temperature $T40_{max}$ would be set to a higher value such that hydrogen/ammonia is used only at high thrusts to eliminate the peaks in T40. The threshold temperature $T40_{max}$ may also depend on the available capacity for holding the different fuels.

In other examples, the threshold temperature $T40_{max}$ may be varied throughout different sections of a flight mission. This allows for the threshold temperature $T40_{max}$ to be varied over a wider range. For example, in periods of high thrust demand, the threshold temperature $T40_{max}$ may be increased, thus requiring greater cooling. In periods of low thrust demand, the threshold temperature $T40_{max}$ may be decreased, requiring less cooling.

Where the threshold temperature $T40_{max}$ is varied through a flight mission the flow of cooling air can be kept constant (when considered as a percentage of the air flow C entering the core gas turbine engine 211). In this case, the cooled engine components or parts will be operated at a lower temperature than when there is no mass flow rate from the second fuel (i.e. x=1), improving the operational life of the parts. Alternatively, the percentage of the air flow C entering the core gas turbine engine 211 can be reduced. This increases the fuel efficiency but means that the components will be operating at a higher temperature, which will increase towards the temperature experienced when there is no mass flow rate from the second fuel (i.e. x=1).

Furthermore, where the proportion of cooling air drawn through cooling duct 214 is variable during a flight, the proportion of cooling air may be increased in portions of the flight where there is a demand for higher thrust (causing hotter temperatures), and in portions of the flight where there thrust demand is reduced, the cooling flow may be decreased, allowing more efficient operation.

Instead of the proportion of cooling air drawn through cooling duct 214 being variable, the engine may be made with a fixed size cooling duct 214, where the proportion of air drawn off is not variable either between or during flights. It will be appreciated that advantages of lower temperature or reduced cooling air can still be obtained for certain use scenarios.

In any of the above examples, there may also optionally be a second threshold temperature $T40_{min}$. When the engine temperature T40 is below the second threshold $T40_{min}$, the relative fractions of the first fuel and second fuel are kept constant or optionally are determined without reference to T40. In one example, only the first fuel may be used (i.e. x=1). When the engine temperature T40 is above the second threshold temperature $T40_{min}$, the relative proportions of the first fuel and second fuel are variable to keep the engine temperature T40 below the maximum threshold temperature $T40_{max}$.

In some examples, the rate of change of the relative proportions of the first fuel and second fuel (i.e. the rate of change of x) may be a first rate when the engine temperature T40 is between the two thresholds $T40_{min}$ and $T40_{max}$ and a second rate when the engine temperature T40 reaches the maximum threshold $T40_{max}$. When the engine temperature T40 reaches the maximum threshold $T40_{max}$ the rate of change of the fuel composition (the reduction in x) is increased.

It will be appreciated that the lower threshold $T40_{min}$ may be utilised in any of the above examples of the first model. Furthermore, the lower threshold $T40_{min}$, which determines the minimum engine temperature at which the fuel composition may be varied, can optionally be used in the below models.

In a second model, the measured temperature T40 and mass flow rates $W_{tot}$, $W_1$, $W_2$ are used to manage the surge margin of one or more of the compressors 204, 205 during a period of acceleration.

Typically, acceleration of a gas turbine engine 104 operating on a single fuel (x=1) includes three stages. Initially, the fuel mass flow rate $W_{tot}$ to the combustor 206 increases, to increase the fuel-to-air ratio. This causes an increase in the combustor exit temperature T40. However, since the compressors 204, 205 are operating at pre-acceleration speed, the pressure at the exit of the high pressure compressor 205 (P30) and hence the pressure at the combustor exit 128 (P40) are substantially at their pre-acceleration value. As a result the mass flow that can be passed by the high pressure turbine 207 is reduced and mass flow through the compressor for a given pressure ratio must also reduce. Thus, the compressor operating point moves materially towards its surge line, where surge may occur.

As the acceleration proceeds, the compressor operating point follows a path lying between its steady-state working line and its surge line. In some cases (particularly for a rapid acceleration) the fuel mass flow rate may be managed so as to maintain an approximately constant surge margin or another desired surge-margin trajectory for at least a portion of the acceleration.

Towards the end of the acceleration, the total fuel mass flow rate $W_{tot}$ is reduced towards a steady state value corresponding to the desired post-acceleration steady state thrust. The compressor operating point thus moves away from its surge line and back towards the steady state working line.

By increasing the relative proportion of an appropriate second fuel in the initial stage of acceleration the extent to which the compressor operating point moves towards its surge line is reduced, but without reducing the available turbine work and thus without reducing the rate of increase in spool speed.

Alternatively, use of the second fuel can be used to maintain the same surge margin, whilst enabling a higher rate of acceleration.

In the later stages of acceleration, the second fuel can be used in a similar manner, either to maintain an increased surge margin (compared to using only the first fuel) or to increase the rate of acceleration (compared to using only the first fuel).

In the first model, the first fuel and second fuel are selected on the basis of achieving a lower combustor exit temperature T40 when using the second fuel. In this second model, the second fuel, which is used to manage the surge margin as described above, should have a higher specific energy than the first fuel. Thus the second fuel can deliver a given amount of energy with a lower fuel mass flow rate than the first fuel. Therefore, migrating to the second fuel in a period of acceleration, with increased thrust demand, does not result in the same increase in mass flow rate as only using the first fuel.

A further factor considered in the choice of the first and second fuel in the second model is the water content of the exhaust products. The first and second fuels are chosen so that the second fuel releases a higher proportion of water vapour on combustion. When using the second fuel to manage the surge margin, the second fuel is selected to release a greater mass of water per unit mass of fuel than the first fuel.

Water vapour has a higher specific heat capacity than other components of the exhaust plume (such as nitrogen, oxygen and carbon dioxide) and thus having more water in the exhaust limits the increase in the combustor exit temperature T40 for a given amount of fuel energy release. A smaller increase in combustor exit temperature T40 means that the same mass of exhaust gas is reduced in volume, so that it passes through the turbines 207, 208 at lower pressure. Furthermore, the increased water vapour content increases the speed of sound and thus velocity of the mass flow through choked sections of the flow path. This may at least partially offset any reduction in mass flow velocity through choked sections of the flow path due to reduced combustor exit temperature T40.

Referring to table 1, it can be seen that for the examples given, ammonia may be used as the first fuel in this example. The fuel may be pure ammonia, or a mixture where ammonia is the predominant component such that relative properties of the first and second fuel are as discussed above. In this case, the second fuel may be any of the other examples given, or mixtures of fuels giving the desired properties. Alternatively, where kerosene (or mixtures where kerosene is the predominant component) is the first fuel, methane or preferably hydrogen, or mixtures where methane or preferably hydrogen is the predominant component may be the second fuel. Where methane is the first fuel (or mixtures where methane is the predominant component), hydrogen or mixtures where hydrogen is the predominant component may be used as the second fuel. It will be appreciated that any of the fuels shown in table 1 can be used in mixtures for the first and second fuel, so long as the relative properties of the first and second fuel are as discussed above.

Over the course of an acceleration in which the relative proportion of the first fuel and second fuel is not changed, the fuel-to-air ratio typically increases and then subsides later in the acceleration. However, it will stabilise at a higher value than before the acceleration, at a new operating point. Where the relative proportion of the first fuel and second fuel is changed throughout a period of acceleration, the fuel-to-air ratio may change differently. For example, the fuel-to-air ratio may decrease in the initial stages of the acceleration (as the relative proportion of the second fuel increases) and/or may increase in the later stages of the acceleration (as the relative proportion of the second fuel decreases).

In known engines, handling bleeds (also known as blow-off valves) can be opened to manage the surge margin. Handling bleeds extract air from the compressor stages 204, 205 and expel it into the bypass flow B. The use of bleeds reduces efficiency and creates noise. Where the relative proportion of the total fuel mass flow rate $W_{tot}$ made up by the different fuels is used to manage a larger surge margin, it may not be necessary to open handling bleeds. This has a corresponding increase in efficiency and reduction in noise.

There are various other scenarios in which a variation on the relative mass flow rates of the first and second fuel $W_1$, $W_2$ may be made to help manage the surge margin. For example, the relative proportion of the second fuel in the sub-idle to pull-away phase during start-up of the engine may be increased. Increasing the proportion of the second fuel allows an increase in the speed of this process. Similarly, in rapid relights or hot reslam accelerations, the surge margin can be reduced due to the hot engine warming the compressed air. In these situations, increasing the proportion of the second fuel increases the surge margin.

In a third model, the relative mass flow rates $W_1$ and $W_2$ may be controlled in order to gradually increase the combustor exit temperature T40 prior to a period of increased thrust demand, such as, for example, prior to a step climb.

Future thrust demand data may indicate when such a period is approaching. Typically, this period is accompanied by a step change in temperature. However, by gradually varying the relative mass flow rates $W_1$, $W_2$ and maintaining constant thrust before the period of increased thrust demand, the combustor exit temperature T40 can be increased. The relative flow of the first fuel is increased to increase the combustor exit temperature T40.

This change could occur over a period of a few minutes or a few tens of seconds. By increasing the combustor exit temperature T40 gradually in advance of a period of increased thrust, the casing, particularly the turbine casing, can be thermally expanded in advance of the thrust increase and thus be ready to accommodate an expanded disc without risk of damage to liners or the casing.

During a corresponding period after the engine 104 returns to cruise operation, the relative mass flow rates $W_1$, $W_2$ may also be adjusted to gradually return the temperature to the steady operational value. This may be done by reducing the relative proportion of the first fuel.

Similarly, the engine 104 may be cooled in advance of a period of reduced thrust, and warmed after.

In a fourth model, the relative mass flow rates $W_1$, $W_2$ could be adjusted continuously throughout a section of level cruise to maintain a substantially constant combustor exit temperature T40. During level cruise, the thrust requirement reduces between the start of the cruise segment and the end of the cruise segment, due to the reduction in aircraft mass as fuel is consumed. Over this period, the relative proportion of the second fuel can be gradually changed to maintain constant T40.

In a fifth model of operation, the relative mass flow rates of the fuels $W_1$, $W_2$ are controlled to control tip clearance of the turbine stages 207, 208. In the engine 104 discussed above, the temperature ratio across each turbine 207, 208 is substantially constant. Therefore, by using predetermined models of the engine 104, the temperature at any stage in the high pressure turbine 207 or low pressure turbine 208 can be determined from the combustor exit temperature T40.

By varying the relative mass flow rates $W_1$, $W_2$ of the fuels, the combustor exit temperature T40, and the temperature at other points in the turbines 207, 208 can thus be controlled without changing the engine thrust.

Known models of thermal expansion of the components of the turbine can be used to determine tip clearance of the rotor blades at different turbine stages within the turbines 207, 208 as a function of temperature. Thus the relative fuel mass flow rates can be used to maintain minimal but nonzero tip clearance.

Typically, tip clearances of different stages will likely increase and decrease independently of each other due to different shaft speeds of the various spools and due to different material choices in different stages of the turbines 207, 208. Thus, in the fifth model, the relative mass flow rates $W_1$, $W_2$ of the fuels are controlled based on the smallest tip clearance at any specific operating point. It may be that increasing the relative proportion of the second fuel can either increase or decrease the tip clearance at different operating points.

As discussed above, the gas turbine engine 104 may optionally include a variable area fan nozzle 212, that allows the area of the outlet from the bypass flow B to be varied.

The person skilled in the art will understand that a gas turbine engine 104 with a single stage fan typically has a maximum fan pressure ratio of around 1.9 or less, and engines with more than one stage of fan may have higher maximum fan pressure ratios. When the first fuel is chosen based on lowering the combustor exit temperature T40 rather than for managing surge margins, running on only the first fuel (i.e. x=1), the thermal operational limit at combustor exit 128 will often be reached before this maximum fan pressure ratio can be achieved. Conversely, when running on only the second fuel (i.e. x=0), the maximum fan pressure ratio may be reached before the maximum combustor outlet temperature T40 is reached. This may not be the case when the first and second fuel are selected based on other factors.

In a sixth model of operation, the size of the variable area fan nozzle 212 may be increased as the relative proportion of the total flow provided by the second fuel increases (i.e. as x decreases) and may decrease as the relative proportion of the total flow provided by the second fuel decreases (i.e. as x increases).

By opening the fan nozzle 212 and thus increasing the bypass mass flow for a given fan pressure ratio, the fully-expanded cold-jet velocity would remain substantially unchanged, without increasing the fan pressure ratio, thus allowing higher thrusts to be accessed without materially degrading propulsive efficiency and without exceeding the maximum fan pressure ratio.

Additionally, or alternatively, the size of the variable area fan nozzle 212 may be changed based on the expected fan pressure ratio based on the current size of the size of the variable area fan nozzle 212. For example, the size of the variable area fan nozzle 212 may be varied to maintain the fan pressure ratio either at a desired value, within a desired range, or below a desired ratio.

In one example, the size of the variable area fan nozzle 212 is varied to keep the fan pressure ratio within a range that provides increased efficiency. In another example, the size of the variable area fan nozzle 212 is only altered if the fan pressure ratio is expected to exceed a desired threshold (for example 1.9). Once this threshold is approached, the size of the variable area fan nozzle 212 may be varied, as described above.

The variable area fan nozzle 212 has a maximum size. Once the variable area fan nozzle reaches this size, the power output of the engine may be changed without varying the size. Once the power output reduces such that the size of the variable area fan nozzle 212 can be reduced below the maximum, the size can again be varied as described above. Therefore, there may be three regimes of operation: a first (with relatively low fan pressure ratio) when the size of the size of the variable area fan nozzle 212 is kept constant; a second where the size of the variable area fan nozzle 212 is varied, and a third where the size of the variable area fan nozzle 212 is at a maximum. In each of the three regimes, the thrust output and other operation factors of the engine may be varied.

The variable area fan nozzle 212 may varied between a number of discrete sizes, or may be continuously varied.

It will also be appreciated that ambient conditions may also contribute to changes in the size of the variable area fan nozzle 212. For example, where air is of lower density (such as at high altitude) a higher fan pressure ratio may be required to achieve a desired thrust compared to higher density air, and so the size of the variable area fan nozzle 212 may be varied to accommodate this.

Alternatively, the fan nozzle 212 may not be variable. In some examples with a fixed (non-variable) fan nozzle 212, the size may be selected to be larger than required for operation using the first fuel only (x=1). However, when a higher fan pressure ratio is required, the relative proportion of the second fuel is increased. This may provide for an increase in top of climb thrust for the same fan size, or a reduced fan size for the same top of climb thrust.

As discussed above, mechanical power may also be extracted from one or more turbine stages 207, 208 of the turbofan engine 104 to drive auxiliary systems of the aircraft, for example via an auxiliary gearbox. In one example, the auxiliary system may optionally include an electrical generator 213. The generator 213 may be driven by one of the turbines 207, 208 in order to provide electrical power direct for use in the engine or cabin of the aircraft, or to drive alternative propulsion systems. Alternatively, generated power may be provided to a battery or other storage (not shown). Electrical power demand can vary dramatically over relatively short timescales.

In a seventh model, the relative mass flow rates of the first and second fuel $W_1$, $W_2$ may be modified based on an electrical demand. For example, as electrical demand increases, the relative proportion of the second fuel flow may be increased and as electrical demand decreases, the relative proportion of the second fuel flow may be decreased. With increased proportion of the second fuel, the amount of work extracted by the turbines 207,208 increases. The increase in second fuel is arranged to offset the increased work requirement due to electrical offtake. Thus the mechanical power delivered to the fan 201 may be unchanged with changing electrical offtake.

Rather than providing constant mechanical power (thrust) with varying electrical offtake, the combustor exit temperature T40 may alternatively be maintained at a constant value with varying electrical offtake.

Alternatively, changes in thrust at a constant electrical power offtake and constant combustor exit temperature T40 can be accommodated. For example, in the event of a climb or other increase in thrust demand, with constant electrical offtake, the relative proportion of second fuel may be increased.

In an eighth model, the engine 104 may be started using the second fuel, dependent on external environment conditions. Cold kerosene has a higher viscosity than warm kerosene. When starting a gas turbine engine 104 on a cold day, kerosene fuel does not achieve such an effective fuel spray into the combustor 206 as it would on a warm day. Thus under such circumstances the engine may be started using the second fuel. The proportion of the first fuel is then increased as the engine warms.

In the above examples, a number of models are presented for determining the relative mass flow rates of the first fuel and second fuel. In some of the models, the combustor exit temperature T40 is reduced by use of the second fuel compared to if only first fuel was used.

The controller 118 is programmed to provide control of the fuel flows $W_1$, $W_2$ to the engine 104 in order to achieve the functionality described above. For a given thrust requirement (or, more generally, a given total output power requirement of the turbofan engine 104) input to the controller at 118, the relative proportion of the first fuel x is used as a variable parameter and corresponding mass flow rates $W_1$ and $W_2$ of the first and second fuel are calculated, taking into account the specific energies of the fuels (i.e. energies per unit mass). The variable parameter has maximum and minimum values which are dependent upon the thrust requirement and specified flight conditions.

An engine performance model calculates, for a proposed mass flow rate $W_1$ of the first fuel, the corresponding required mass flow rate $W_2$ of the second fuel to satisfy the engine thrust (or engine output power) requirement input to the controller 118 at prevailing flight conditions including parameters such as combustor exit temperature T40, ambient static temperature, pressure and relative humidity, and the forward velocity, as indicated by the sensors of the aircraft comprising the system 100.

In an alternative embodiment, the size of the core gas turbine engine 211 may be reduced compared to previous embodiments. In this alternative embodiment, the maximum temperature at the combustor exit 128 is similar to the previous embodiments when operating on the first fuel only (i.e. x=1). However, increasing the proportion of the second fuel used at higher power requirements means that the smaller core gas turbine engine 211 can still produce the same power output as previous embodiments without an increase in the maximum combustor exit temperature compared to a larger engine operating on only the first fuel.

In a gas turbine engine 104, cooling air may be extracted from one or more of the compressors 204, 205 and reinserted into the core flow C downstream of the combustor 206 to provide cooling, as discussed above. Other forms of cooling are also used in some gas turbine engines 104. For example, in some engines, compressor intercooling may be provided, where heat is transferred to a heat sink between compressors 204, 205 in the core gas turbine engine 211.

The specific heat capacity of hydrogen is substantially higher than that of dry air and also hydrocarbon fuels such as kerosene. Furthermore, the heat capacity of a flow of gaseous hydrogen and/or ammonia, when flowing at a mass flow rate necessary to deliver the same fuel energy flow as a flow of kerosene fuel, is substantially higher than the heat capacity of the flow of kerosene fuel. Therefore, the second fuel may optionally be used as a heat sink for the engine 104. For example, the ducts 114 providing the flow of fuel may be directed in the vicinity of the intercooling before being provided to the combustor 206.

Although the specific heat capacity of ammonia is much lower than hydrogen, the fact that the fuel mass flow when using ammonia would be substantially higher than for hydrogen (due to ammonia's relatively low fuel specific energy) means that the heat capacity of the required fuel flow would be similar to that of hydrogen.

Any of the fuels discussed above may be used as a heat sink. Depending on the fuel, the first fuel and/or second fuel may be used as a heat sink.

In another example, the fuel may be used as a heat sink to pre-cool cooling air extracted from the compressors 204, 205, before it is provided to the later stages of the engine. This may reduce the mass flow of cooling air required for various cooling tasks. Coupled with the reduction in combustor exit temperature T40 due to compressor intercooling and choice of fuel mix from the above models, the cooling air requirement could be substantially reduced. In some embodiments, turbine cooling may be eliminated altogether.

A number of different fuels are discussed above by way of example. Any suitable hydrocarbon and non-hydrocarbon fuel may be used. For example, in at least some of the models discussed above, the first fuel can be kerosene or methane, and the second fuel can be ammonia or hydrogen. Furthermore, any mixture of fuels may be used. For example, pure ammonia has low laminar flame speed. To overcome this, it may be used in a mixture with hydrogen. For example, the mixture may be a 10%/90% by mass hydrogen/ammonia mixture.

In general, in most of the models discussed above the second fuel generates a lower combustor exit temperature T40 in order to produce the same amount of work as the first fuel, when considering operating an engine on a single fuel. In addition or alternatively, the second fuel may have a lower specific energy such that a higher mass flow rate of fuel is required to achieve the same fuel energy input rate as the first fuel, thus increasing the mass flow through the turbines 207, 208. Therefore, introducing the second fuel reduces the engine temperature T40 for generating the same amount of work. In the second model, the second fuel should require a lower fuel mass flow rate to produce the same amount of work.

FIG. 4 illustrates an alternative example of the aircraft propulsion system 100 shown in FIG. 2. The system 100 shown in FIG. 4 is the same as in FIG. 2, unless explicitly stated otherwise and the same reference numerals are used where features are the same.

In addition to the first fuel tank 106 and second fuel tank 108, the propulsion system 100 of FIG. 4 includes a third fuel tank 130 storing a third fuel. The third fuel is conveyed from the third fuel tank 130 to the engine 104 through a third fuel duct 132. The first fuel duct 132 includes a third valve or flow regulator 134 for adjusting the mass flow rate $W_3$ of the third fuel from the third fuel tank 130 to the engine 104 during operation. As with the first valve 112, and second fuel valve 116, the third fuel valve 134 is controlled by the controller 118.

In one example, the third fuel may be a different fuel that also causes a reduction in combustor exit temperature T40 compared to the first fuel, for the same amount of work. For example, the second fuel may be hydrogen, and the third fuel may be ammonia. It may be that the total fraction (1−x) of non-hydrocarbon fuel is made of various mixtures or combinations of the two non-hydrocarbon fuels. In other words, the total fuel mass flow rate $W_{tot}$ may be made up of $W_1+W_{NHC}$ where $W_{NHC}=W_2+W_3$.

The above models may also be used to determine the third fuel and the operation between the three fuels.

For example, if high steady-state thrust is required (such as at top-of-climb and/or during step-climb), then ammonia may be used as the third fuel, and operation may migrate towards ammonia, to enable a lower T40 for the same turbine work.

On the other hand, during an engine acceleration (and particularly the early parts of an engine acceleration), it may be preferable to migrate towards hydrogen since it increases compressor surge margin relative to other fuels.

The available amount of each fuel is also considered as a factor.

Whether using two fuels, three fuels or more, the default strategy would be to favour use of those fuels with the lower specific energy earlier in the mission, as discussed in US 2016/146117. For example, this may mean burning ammonia (or an ammonia-rich mixture/combination) early on (e.g. during climb), then kerosene, then keeping the available hydrogen for the later parts of the mission. Operation may depart from the default strategy as necessary. For example, using hydrogen during ground-manoeuvres due to its clean-burning nature, and for any accelerations. Some ammonia may be kept in reserve in case of an engine failure and may allow increased thrust to be generated from remaining operative engine(s, without exceeding a T40 threshold. Additionally or alternatively, reserve ammonia may be used in a brief period of higher thrust during a go-around (following an acceleration in which hydrogen may be used to manage surge margin).

Compared to hydrogen, ammonia is easier to store, either as gas (since it does not require such high pressures to achieve an acceptable volumetric energy density) or as liquid (since it does not require such low temperatures to maintain the liquid state). Thus fuel mass as a proportion of total fuel system mass can be higher for ammonia than for hydrogen, meaning that the effective specific energy of ammonia is closer to that of hydrogen than the specific energy of the fuels alone. Furthermore, a propulsion system 100 becomes materially lighter as ammonia is consumed, and thus its thrust requirement reduces. With hydrogen however (for which much of the weight is in the tanks rather than the fuel), weight reduction during flight is less significant.

The sensors discussed above are given by way of example only. Any other sensor inputs may be provided.

In the example discussed above, a single engine 104 is provided in the engine system 102. However, this is by way of example only. Any number of engines may be provided. Each separate engine may be supplied with fuels by conduits with independently operated valves, such that the mass flow rates $W_{tot}$, $W_1$, $W_2$ to each engine 104 can be controlled independently. In other examples, the flow of a single fuel type to two or more engines may be controlled by a single valve.

In the examples discussed above, the gas turbine engine 104 is an aircraft engine having a period of operation (flight mission) from switch on to switch off. It will be appreciated that the gas turbine engine 104 may be used to generate propulsive power or other mechanical power in any other suitable setting such as marine craft, land craft or other applications such as power generation. The period of operation may be considered from switch on to switch off or any other suitable period. As also discussed above, the engine 104 may be other types of engine 104, and is not limited to a gas turbine. The engine temperature may be measured at the hottest part of the engine, or at any other suitable point.

The invention claimed is:

1. An engine system comprising:
a first fuel store of a first fuel;
a second fuel store of a second fuel;
an engine arranged to produce mechanical power by combustion or oxidation of fuel in the engine;
a fuel distribution system arranged to deliver fuel from the first and second fuel stores to the engine, the first fuel delivered at a first mass flow rate, the second fuel delivered at a second mass flow rate, the first and second mass flow rates contributing to a total mass flow rate of fuel to the engine; and
a control system arranged to control the relative fractions of the total mass flow rate of fuel to the engine represented by the first and second mass flow rates according to the required power output of the engine such that the relative fraction of the total mass flow rate of fuel to the engine represented by the second mass flow rate increases with increasing required power output of the engine for at least part of a period of operation of the engine,
wherein the first and second fuels are selected such that operation of the engine using only the second fuel results in a lower engine temperature than operation of the engine using only the first fuel, when producing the same amount of mechanical power and/or wherein the second fuel has a lower specific energy than the first fuel and/or wherein the second fuel produces more water during combustion than the first fuel per unit of fuel energy released during combustion, and
wherein the control system is arranged to, during a period of acceleration, control the relative fractions of the total mass flow rate of fuel represented by the first mass flow rate and the second mass flow rate based on a surge margin.

2. The engine system of claim 1, wherein one of the first fuel or second fuel has a higher specific energy than the other of the first fuel and second fuel and releases a greater mass of water per unit mass of fuel than the other of the first fuel and second fuel, wherein the control system is arranged to increase the relative fraction of the one of the first fuel or second fuel during an initial portion of the period of acceleration, and wherein the control system is arranged to reduce the relative fraction of the total mass flow rate of fuel represented by the one of the first fuel and second fuel during a final portion of the period of acceleration.

3. The engine system of claim 2, wherein the control system is arranged to control the relative fractions of the total mass flow rate of fuel provided by the first mass flow rate and second mass flow rate such that:
the surge margin is increased compared to operating on the other of the first fuel or second fuel only and the rate of acceleration is the same as operating on the other of the first fuel or second fuel only; or
the surge margin is the same as operating on the other of the first fuel or second fuel only and the rate of acceleration is increased compared to operation using the other of the first fuel or second fuel only.

4. The engine system of claim 1, wherein the control system is arranged to, during a period of operation of the engine, control the relative fractions of the total mass flow rate of fuel represented by the first mass flow rate and the second mass flow rate, based on an engine temperature, and is arranged to control the relative fractions of the total mass flow rate of fuel represented by the first mass flow rate and the second mass flow rate to change the engine temperature at a first rate of change, whilst maintaining constant mechanical power.

5. The engine system of claim 4, wherein the relative fractions of the total mass flow rate of fuel represented by the first mass flow rate and the second mass flow rate are controlled to keep the engine temperature constant for at least a section of a period of operation.

6. The engine system of claim 5, wherein the mechanical power demand of the engine varies over the section of the period of operation in which the engine temperature is kept constant by control of the relative fractions of the total mass flow rate of fuel represented by the first mass flow rate and the second mass flow rate.

7. The engine system of claim 4, wherein the engine comprises an electrical generator powered by operation of the engine, wherein an electrical power drawn by the generator varies over a section of the period of operation, and wherein the control system is further arranged to:
control the relative fractions of the total mass flow rate of fuel represented by the first mass flow rate and the second mass flow rate, based on the engine temperature and the electrical demand.

8. The engine system of claim 7, wherein the mechanical power is maintained as constant for the section of the period of operation over which the relative fractions of the total mass flow rate of fuel represented by the first mass flow rate and the second mass flow rate are controlled based on the engine temperature and the electrical demand.

9. The engine system of claim 4, wherein the engine temperature is determined for a hottest part in the engine.

10. The engine system of claim 1, wherein the control system is further arranged to start the engine using the second fuel based on an ambient temperature.

11. The engine system of claim 1, wherein the engine is a gas turbine engine.

12. The engine system of claim 1, wherein the engine is an aircraft engine.

13. An engine system comprising:
a first fuel store of a first fuel;
a second fuel store of a second fuel;
an engine arranged to produce mechanical power by combustion or oxidation of fuel in the engine;
a fuel distribution system arranged to deliver fuel from the first and second fuel stores to the engine, the first fuel delivered at a first mass flow rate, the second fuel delivered at a second mass flow rate, the first and second mass flow rates contributing to a total mass flow rate of fuel to the engine; and
a control system arranged to control the relative fractions of the total mass flow rate of fuel to the engine represented by the first and second mass flow rates according to the required power output of the engine such that the relative fraction of the total mass flow rate of fuel to the engine represented by the second mass flow rate increases with increasing required power output of the engine for at least part of a period of operation of the engine,
wherein the first and second fuels are selected such that operation of the engine using only the second fuel results in a lower engine temperature than operation of the engine using only the first fuel, when producing the same amount of mechanical power and/or wherein the second fuel has a lower specific energy than the first fuel and/or wherein the second fuel produces more water during combustion than the first fuel per unit of fuel energy released during combustion,
wherein the control system is arranged to, during a period of operation of the engine, control the relative fractions of the total mass flow rate of fuel represented by the first mass flow rate and the second mass flow rate, based on an engine temperature, and is arranged to control the relative fractions of the total mass flow rate of fuel represented by the first mass flow rate and the second mass flow rate to change the engine temperature at a first rate of change, whilst maintaining constant mechanical power, and
wherein the control system is arranged to vary the engine temperature at constant mechanical power prior to a period of increased or decreased mechanical power demand to pre-warm or pre-cool the engine, wherein the first rate of change is slower than the rate of change of engine temperature resulting from the change in mechanical power demand without pre-warming or pre-cooling.

14. The engine system of claim 13, wherein the control system is arranged to control the relative fractions of the total mass flow rate of fuel represented by the first mass flow rate and the second mass flow rate to keep the engine temperature below a threshold temperature for at least a section of a period of operation, wherein the threshold temperature is variable in different sections of the period of operation.

15. The engine system of claim 14, wherein the control system is arranged to increase the threshold temperature in sections of the period of operation with higher mechanical power demand and reduce the threshold temperature in sections of the period of operation with lower mechanical power demand.

16. The engine system of claim 15, wherein the engine comprises an air flow that is compressed and mixed with the fuel for combustion or oxidation, and a portion of the air flow is removed prior to combustion or oxidation, to provide cooling air for cooling parts of the engine, wherein the control system is further arranged to:
vary a proportion of the air flow removed for cooling air over the period of operation.

17. The engine system of claim 14, wherein the control system is arranged to:
when the engine temperature is below a second threshold temperature, lower than the threshold temperature, keeping the relative fractions of the total mass flow rate of fuel represented by the first mass flow rate and the second mass flow rate constant; and
when the engine temperature is above the second threshold temperature, varying the relative fractions of the total mass flow rate of fuel represented by the first mass flow rate and the second mass flow rate to keep the engine temperature below the threshold temperature.

18. The engine system of claim 13, wherein the first fuel and second fuel are selected from hydrocarbon fuels and non-hydrocarbon fuels.

19. A method of operating an engine system in which mechanical power is generated by combustion or oxidation of fuel in an engine, the method comprising:
providing a first fuel from a first fuel store to the engine at a first mass flow rate;
providing a second fuel from a second fuel store to the engine at a second mass flow rate, wherein the first mass flow rate and second mass flow rate contribute to a total mass flow rate of fuel to the engine;

controlling the relative fractions of the total mass flow rate of fuel to the engine represented by the first and second mass flow rates according to the required power output of the engine such that the relative fraction of the total mass flow rate of fuel to the engine represented by the second mass flow rate increases with increasing required power output of the engine for at least part of a period of operation of the engine;

controlling the relative fractions of the total mass flow rate of fuel represented by the first mass flow rate and the second mass flow rate based on a surge margin, wherein the first and second fuels are selected such that operation of the engine using only the second fuel results in a lower engine temperature than operation of the engine using only the first fuel, when producing the same amount of mechanical power and/or wherein the second fuel has a lower specific energy than the first fuel and/or wherein the second fuel produces more water during combustion than the first fuel per unit of fuel energy released during combustion.

* * * * *